United States Patent [19]

Araki

[11] Patent Number: 4,733,517

[45] Date of Patent: Mar. 29, 1988

[54] APPARATUS FOR FILLING BAGS

[75] Inventor: Yozo Araki, Nagoya, Japan

[73] Assignee: Mitsubishi Jukogyo Kabushiki Kaisha, Japan

[21] Appl. No.: 927,804

[22] Filed: Nov. 6, 1986

Related U.S. Application Data

[62] Division of Ser. No. 837,092, Mar. 5, 1986, Pat. No. 4,674,266.

[30] Foreign Application Priority Data

Jun. 15, 1983 [JP] Japan ................................ 58-107284
Oct. 5, 1983 [JP] Japan ................................ 58-186314
Oct. 5, 1983 [JP] Japan ................................ 58-186315
Nov. 28, 1983 [JP] Japan ................................ 58-223508

[51] Int. Cl.$^4$ .............................................. B65B 3/12
[52] U.S. Cl. ......................................... 53/84; 53/202; 141/126
[58] Field of Search ................... 53/84, 202, 79, 269, 53/386, 385, 384; 141/126, 10, 114, 115, 214, 226, 48, 39-43, 215

[56] References Cited

U.S. PATENT DOCUMENTS 3,710,541 1/1973 Izumi .............................. 53/386 X
3,982,376 9/1976 Ikeda ............................. 53/385 X
4,108,300 8/1978 Hayase et al. ................... 53/384 X
4,648,154 3/1987 Meinen ........................... 141/114 X Primary Examiner—James F. Coan
Attorney, Agent, or Firm—McGlew and Tuttle

[57] ABSTRACT

The present invention relates to an apparatus for filling bags with a material and for sealing them, and it can carry the bags in a direction of a bag thickness. A first feature of the present invention resides in that, in the case that the bags are arranged between a pair of chain conveyors disposed in parallel vertical planes, they are gripped by plural pairs of grippers mounted on a pair of axes extending through each rectangular parallelepiped carrier. Further, A second feature of the present invention is that the apparatus according to the present invention is equipped with nozzles for introducing a compressed gas into the bags and pressure gauges for measuring a pressure within the bags in order to detect whether or not each bag is normally gripped by the grippers. Furthermore, another feature of the present invention is that a return pipe is fixed to a filling device so that the filling material may be returned to a storage tank, without being discharged therethrough, by closing the filling nozzle. Still another feature of the present invention is that seal bars for sealing the bags are covered with a heat-resistant cloth, and the cloth is sent out in turn to maintain uniform sealing conditions.

2 Claims, 30 Drawing Figures

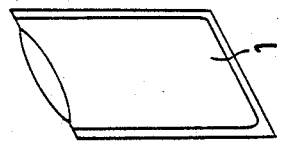
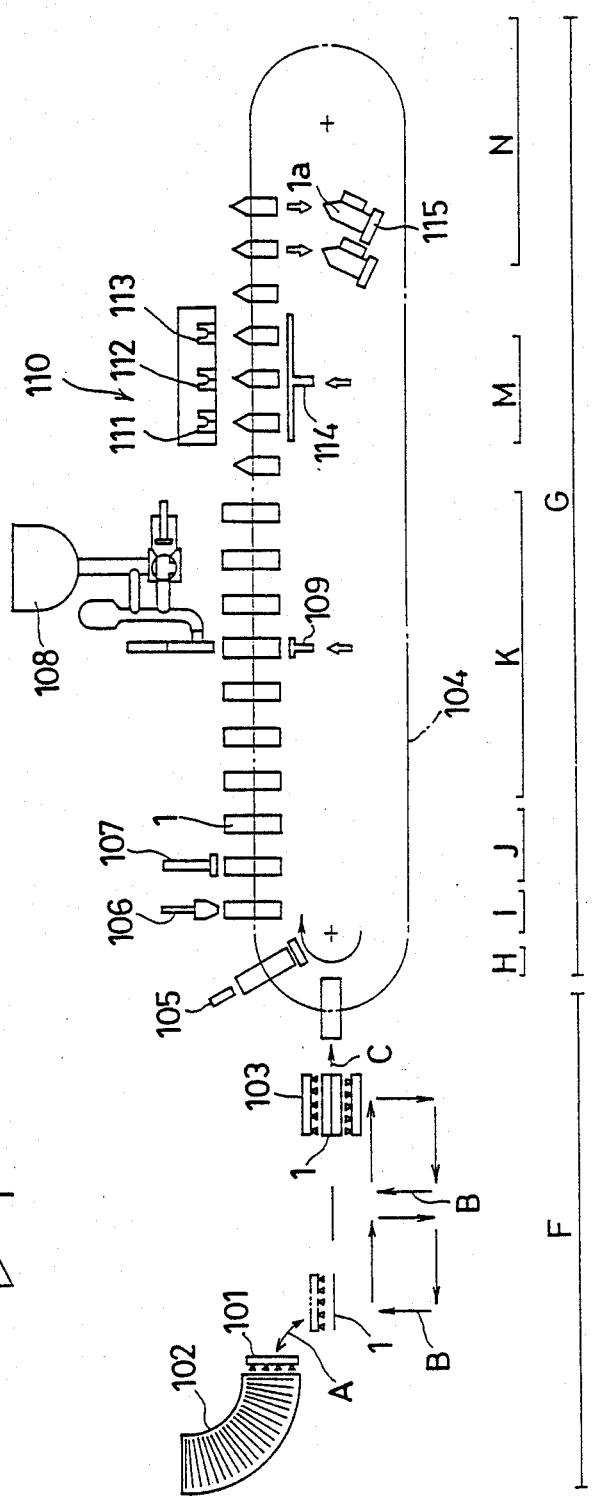
FIG. 1
FIG. 4

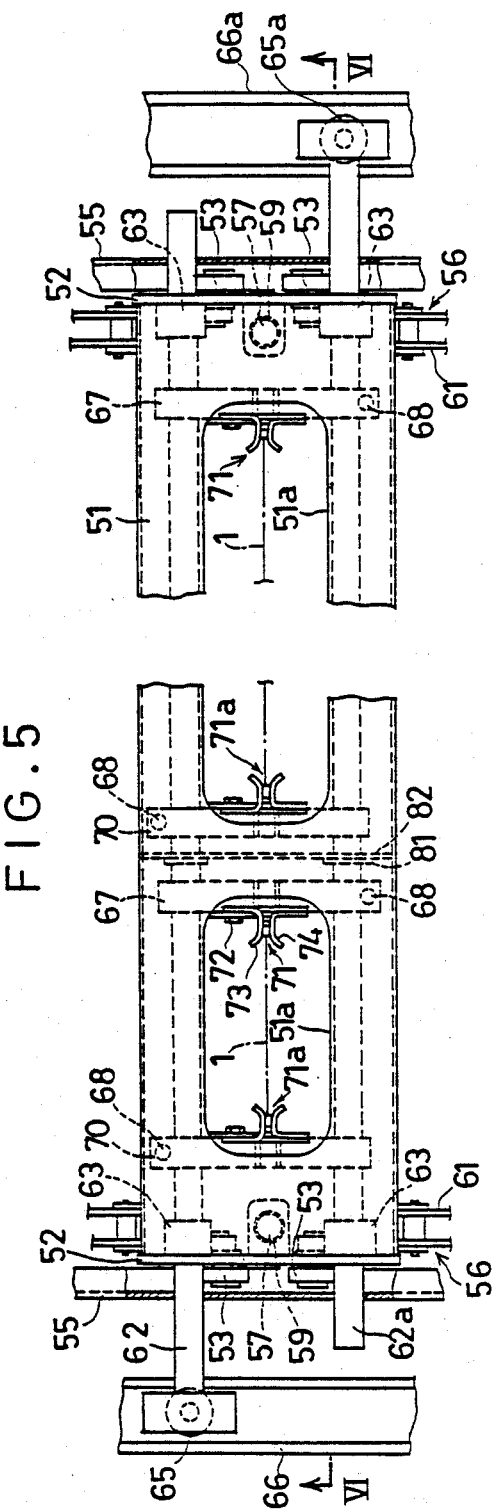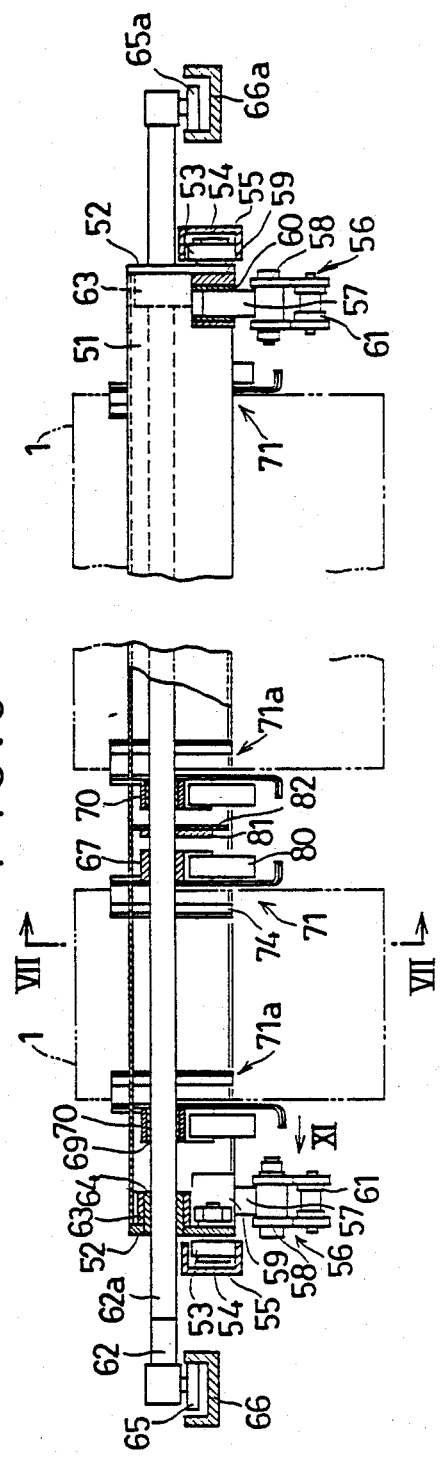

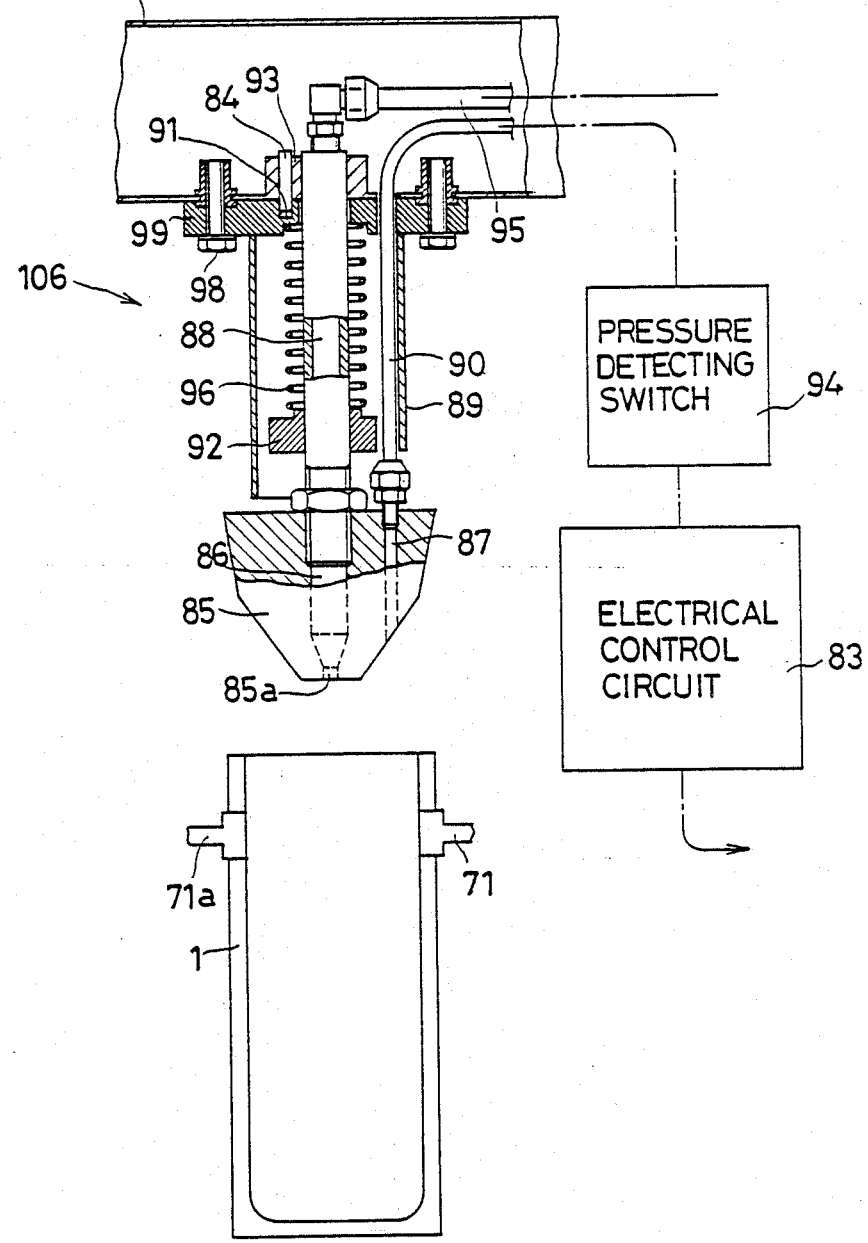

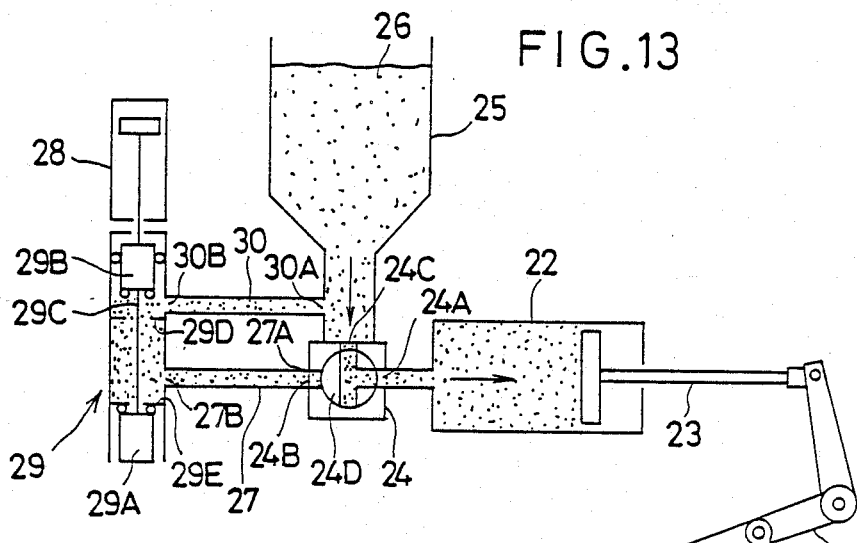

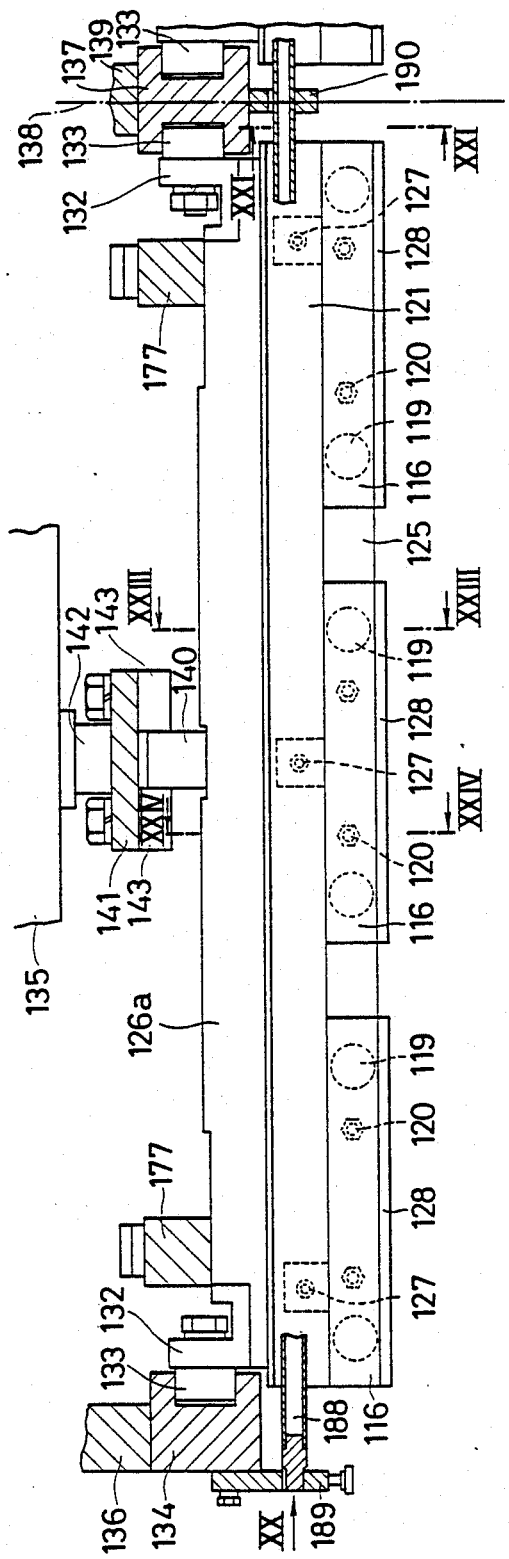
FIG. 19
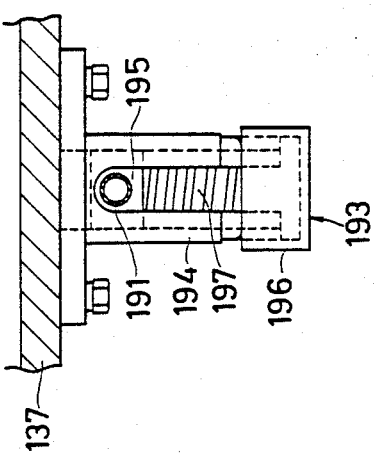
FIG. 22
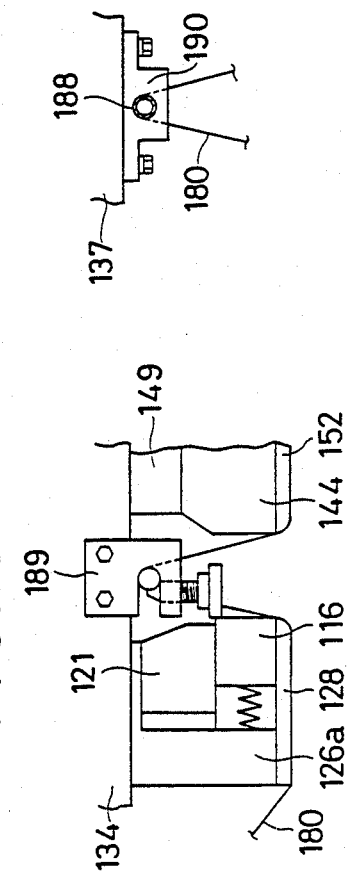
FIG. 21
FIG. 20

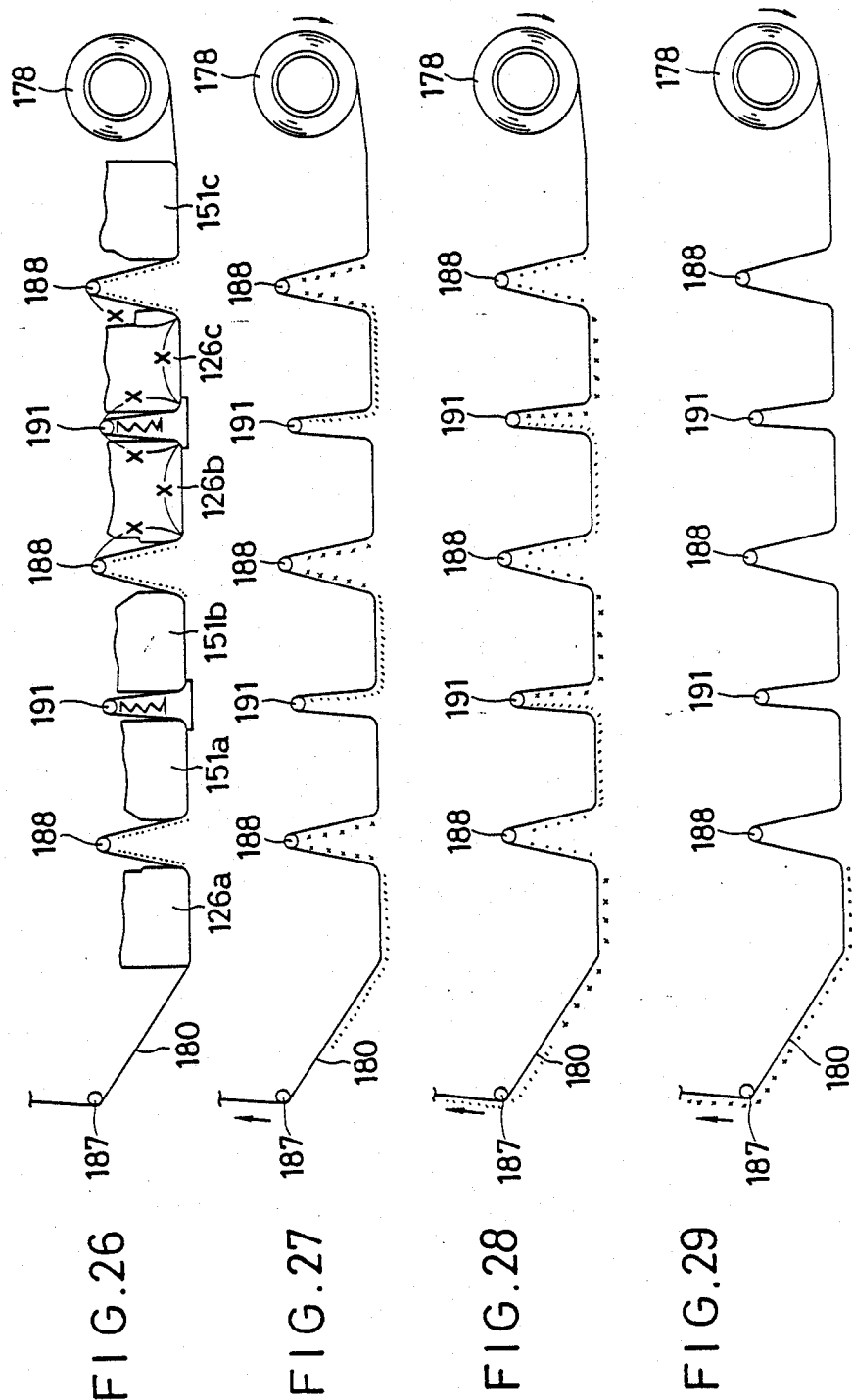

APPARATUS FOR FILLING BAGS

This is a division of application Ser. No. 837,092 filed Mar. 5, 1986, now U.S. Pat. No. 4,674,266.

The present invention relates to an apparatus for filling bags with a material and for sealing them.

The apparatus for filling the bags has already been suggested in U.S. Pat. No. 4,108,300. Each bag used on this apparatus comprises a laminate of a plastic film over a paper or an aluminum foil sheet and is previously sealed along three edges thereof, as shown in FIG. 1 attached hereto. Further, the bag 1 may be a gusseted bag wherein its bottom is folded in a gusset style so as to be capable of standing by itself.

Such an apparatus is shown in FIGS. 2 and 3. A pair of chain conveyors 2 which are disposed in parallel vertical planes is supported on five pairs of sprockets 3. Each pair of the sprockets is mounted on an axle 4. Reference numerals 5 and 6 are a motor and an index device respectively, and the axles 4 can be intermittently rotated thereby. Grippers 7 are mounted at equidistant intervals on the chain conveyors 2 and are adapted to grip upper portions of the bags 1. Numerals 8 and 9 are rails for guiding the grippers 7 and a magazine for stocking the bags 1 respectively. A bag taking out member 10 serves to take out the bags 1 from the magazine 9 one by one and to transfer them to regions between the opposite grippers 7, 7. Numeral 11 is a bag opening member and possesses known vacuum cups by which the bags 1 gripped between and by the grippers 7, 7 are opened. At this time, the opposite grippers 7, 7 approach to each other so as to assist the bags 1 in opening, and the opened bags 1 are carried while kept opened. Numeral 12 is a filling device for a material and numeral 13 is a sealing device for the bags 1. The bags 1 which have been filled with the material and have been sealed are then discharged as bag products 1a through a belt conveyor 14.

It will be understood that the efficiency of such an apparatus for filling the bags can be improved by carrying the bags 1 along two or more carrying lines. However, the attempt to carry the bags 1 along a plurality of the carrying lines in the shown apparatus is not so different from a combination of a plurality of the same apparatuses, though the motor 5 and a link mechanism for the bag taking out device 10 can be utilized in common.

In addition, in the case that the apparatus is run at a high speed, an insecure bag taking out operation or an insecure bag grip of the grippers will be brought about sometimes, which fact will lead to an inaccurate bag grip between the grippers. At this time, the work of the material filling must be interrupted. In the conventional apparatuses, however, any mechanism for judging whether or not the bags are surely gripped is not equipped, and there has not been suggested any method for filling, with the material, all the bags on the plural carrying lines except one bag.

An object of the present invention is to detect whether or not the bags are securely grippted by the grippers, in order to prevent the material from contaminating the apparatus when the insecurely grippted bag or the bag not gripped is filled with the material.

Another object of the present invention is to provide a filling apparatus which can usefully function when the filling of the material must be interrupted. Therefore, where the bags are carried along the only one carrying line or where a filling device is independently provided in the apparatus, the present inventioin is not necessary, because in such a case, the work of the material filling can be interrupted merely by causing the filling device alone to stop. The present invention contemplates halting only one of the plural filling devices, when needed, while they are run by the use of an only one link mechanism.

Still another object of the present invention is to provide an apparatus suitable for the transit of the bags along plurally arranged carrying lines. The apparatus of the present case does not comprise laterally disposed several conventional apparatuses but simplified mechanisms including an element referred to as a carrier.

The above-mentioned and other objects, features and benefits of the present invention will be definite from the following detailed description in reference to accompanying drawings, in which:

FIG. 1 is a perspective view of a bag used on an apparatus;

FIG. 4 is a schematical illustrative view of an apparatus according to the present invention;

FIG. 5 is a plan of a carrier portion;

FIG. 6 is a sectional view taken along a line VI—VI in FIG. 5;

FIG. 12 is a view illustrating a device for opening and forming the bags;

FIGS. 13, 14 and 15 illustrate a filling device, and show its metering state, filling state and non-filling state, respectively;

FIG. 19 is a sectional view taken along a line XIX—XIX in FIG. 17;

FIG. 20 is a view which is seen from the direction of an arrow XX in FIG. 19;

FIG. 21 is a sectional view taken along a line XXI—XXI in FIG. 19;

FIG. 22 is a sectional view taken along a line XXII—XXII in FIG. 25;

FIGS. 26 to 29 are views illustrating a sheet-feeding state; and

Figure 2:
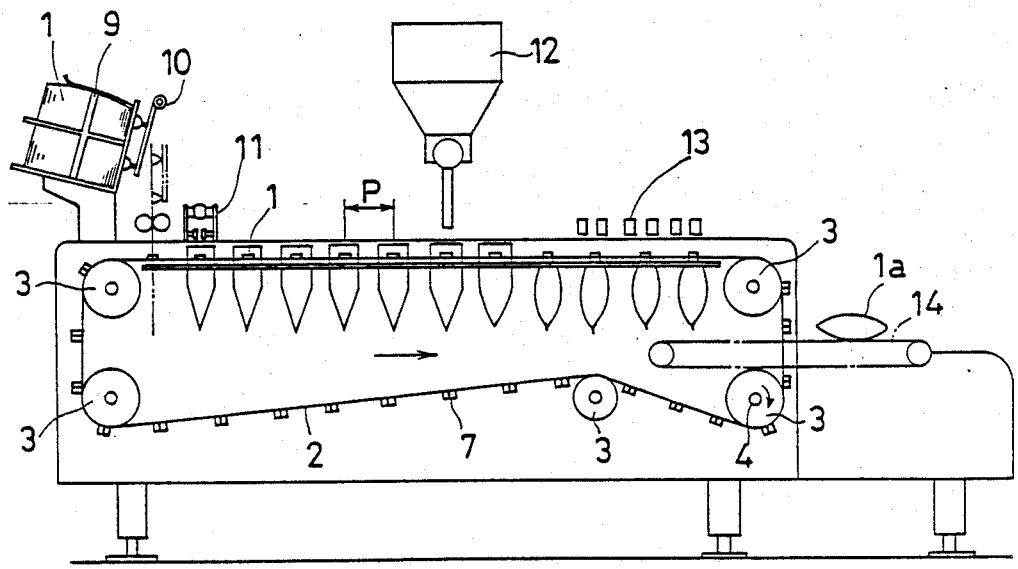
FIG. 2 is a front view of a conventional apparatus for filling the bags.
Figure 3:
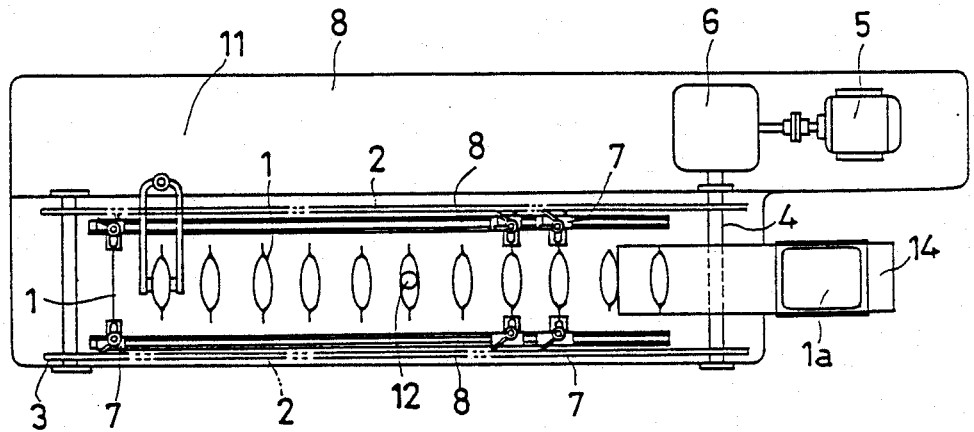
FIG. 3 is a plan of the apparatus shown in FIG. 2.

Now, the present invention will be described in reference to an embodiment exhibited in the drawings.

FIG. 4 shows the whole apparatus as one embodiment of the present invention. This embodiment comprises a six-line simultaneous carrying system, but the number of the carrying lines is not limited. In the drawing, alphabet F represents a bag taking out and bag opening zone, G is a bag carrying zone, H is a detection zone, I is a shaping zone, J is an elimination zone, K is a filling zone, M is a sealing zone and N is a discharge zone.

Reference numeral 101 is a bag taking out device which serves to take out the bags from a magazine 102 one by one with the aid of vacuum suckers, turn each bag as indicated by an arrow A in the drawing, and transfer it to a carrying member which is not shown.

Numeral 103 is a preliminary opening device. According to this preliminary opening device, the bag 1, which has been transferred thereto from the carrying member moving along a rectangular course as indicated by an arrow B in the drawing, is sucked on the upper and lower portions thereof by means of vacuum suckers in order to preliminarily open the bag 1, separating the upper and lower portions thereof from each other. Each bag 1 is then transferred to between a pair of grippers for gripping the bag in a carrier, which will be described hereinafter, by a forcing member not shown, as indicated by an arrow C in the drawing. The carrier above is carried by a pair of chain conveyors 104 which are disposed in parallel and vertical planes.

Numeral 105 is a bag presence detecting device which serves to detect whether or not the bag 1 is gripped by the grippers, with the aid of an optical detecting means or a limit switch.

Reference numeral 106 is a bag opening and shaping device which expands the lower portion of each bag 1 and detects whether or not the bag 1 is surely gripped by the grippers. A detailed description of this device 106 will be made hereinafter.

Numeral 107 is a defective bag eliminating device which forcedly eliminates out the defective bag on the basis of signals from the bag presence detecting device 105 and the bag opening and shaping device 106 when the defective bag has arrived at the bag eliminating device.

Numeral 108 is a filling device which fills, with a filling material, the bags 1 in the carrier lifted by a lifting member 109.

Numeral 110 is a sealing device which comprises a first heat sealing device 111, a second heat sealing device 112 and a cooling device 113. According to the sealing device, after air remaining in the bag 1 has been expelled out therefrom through its opening by means of a deaerator which is not shown, the bag 1 in the carrier lifted by a lifting member 114 is heat sealed along the edge of its opening and, and contents in the bag are then cooled and solidified. A detailed description of the sealing device 110 will be made hereinafter.

Numeral 115 is a discharge conveyor which is disposed crossing the chain conveyor 104 at right angles and which serves to discharge heat sealed bag products 1a toward a farther process.

Next, a carrying mechanism of the apparatus according to the present invention will be described.

FIGS. 5 to 11 show an embodiment of the mechanism of carrying the bags 1 transferred from the above-mentioned preliminary opening device 103.

Figure 7:
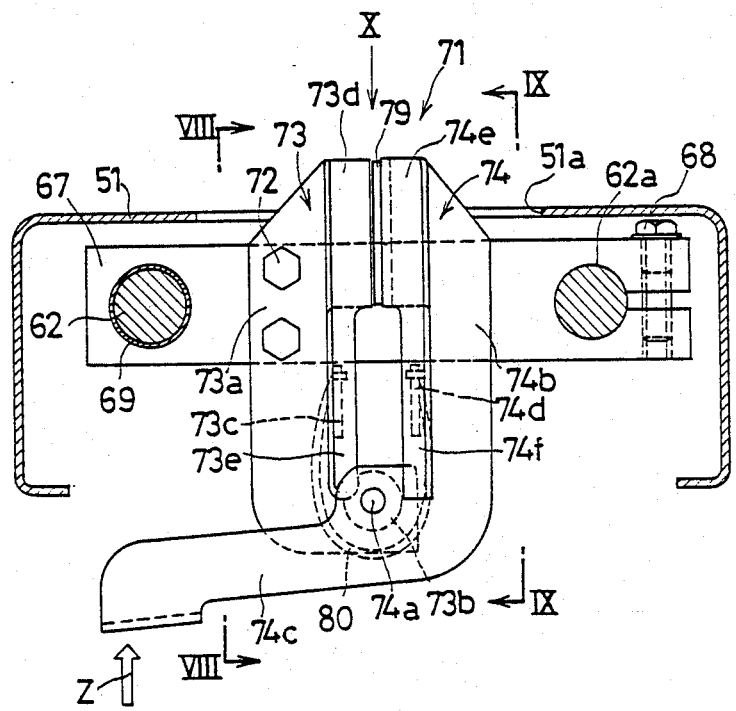
FIG. 7 is a sectional view taken along a line VII—VII in FIG. 6.
Figure 8:
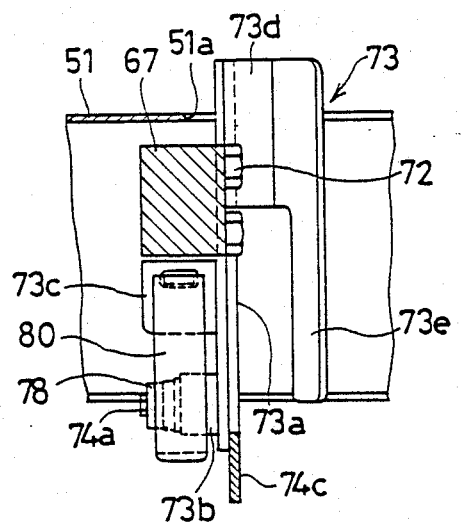
FIG. 8 is a sectional view taken along a line VIII—VIII in FIG. 7.

In the drawings, numeral 51 is a carrier which takes the form of a rectangular parallelepiped box having such an approximately U-shaped sectional view as shown in FIG. 7. The carrier 51 is securely provided, on the opposite ends thereof, with side plates 52 and is formed with a plurality of windows 51a corresponding to the number of the carrying lines for the bags 1. Link plates 58 having lugs 57 are mounted on each chain conveyor 104, and each lug 57 is inserted into a bearing bush 60 in a guide 59 secured to the side plate 52 in order to mount the carrier 51 on the chain conveyor 104 in an upward and downward movable manner. A roller 53 rotatably and horizontally supported on each side plate 52 by a supporting shaft 54 and the like can be slidably moved within a guide rail 55 secured to a body frame not shown.

Each of shafts 62, 62a is slidably supported, via a bearing bush 64, on a guide 63 secured to the side plate 52, and is arranged so as to cross the chain conveyor 104 at right angles. Rollers 65, 65a are mounted on end portions of the shafts 62, 62a and can roll within guide rails 66, 66a. These guide rails 66, 66a are fixed to the body frame which is not shown, and an edge portion of each guide rail is folded in a width direction of the carrier 51, so that the shafts 62, 62a can move along the guide rails 66, 66a in accordance with operations of opening and closing the bags 1.

A slider-A 67 is secured to the shaft 62a by fastening a bolt 68 and is adapted to slidably move along the shaft 62 via a bearing bush 69. Further, a slider-B 70 is secured to the shaft 62 by the bolt 68 and is adapted to slidably move along the shaft 62a via the bearing bush 69. A gripper-A 71 comprises a stationary gripper 73 fixed on the slider-A 67 by a bolt 72 and the like and a rotary gripper 74 for gripping the opposite edges of each bag 1 in cooperation with the stationary gripper 73. A gripper-B 71a is mounted on the slider 70, confronting the above-mentioned gripper-A 71.

The stationary gripper 73 is fixed within a recess groove 75 (FIG. 10) of the slider-A 67 by means of a bolt 72 and is integrally and securely provided with a boss 73b behind it. The stationary gripper 73 is provided, in the intermediate portion thereof, with a bracket 73c folded 90° and is provided, in the front portion, with a gripping portion 73d folded 90° in a direction opposite to the bracket 73c. Further, a plate 73e for preventing a swing of the bags 1 extends downwardly from the gripping portion 73d.

Figure 9:
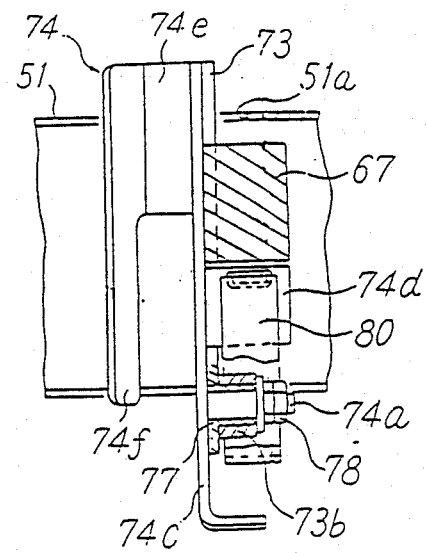
FIG. 9 is a sectional view taken along a line IX—IX in FIG. 7.
Figure 10:
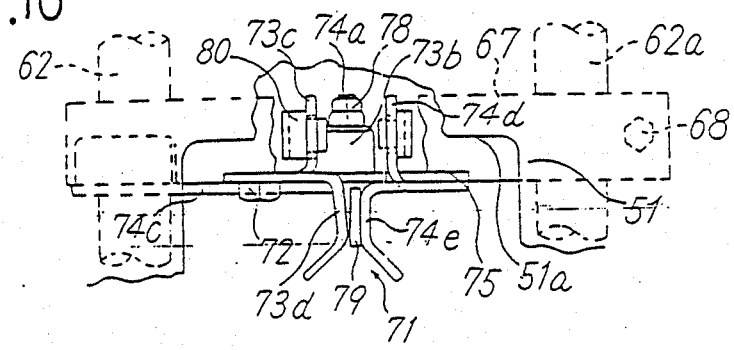
FIG. 10 is a view which is seen from the direction of an arrow X in FIG. 7.
Figure 11:
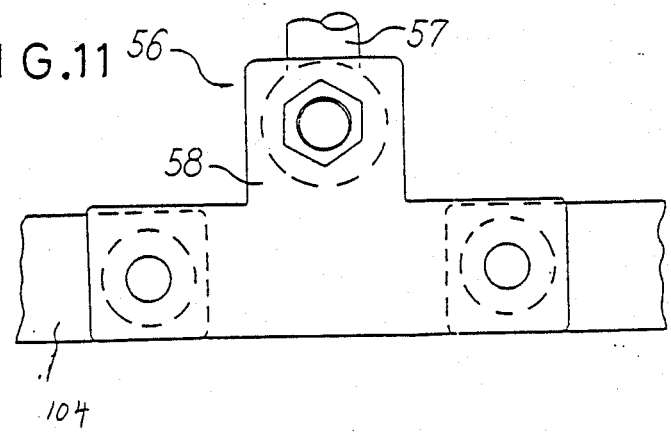
FIG. 11 is a view which is seen from the direction of a arrow XI in FIG. 6.

A shaft portion 74a is inserted into the boss 73b of the stationary gripper 73 with the interposition of a bearing bush 77 as shown in FIG. 9, therefore the rotary gripper 74 can rotatively be moved by a nut 78 and the like. The rotary gripper 74 is provided, on the lower end portion thereof, with an arm 74c, is provided, in the mediate portion thereof, with a bracket 74d folded 90°, and is provided, on the upper end portion thereof, with a gripping portion 74e folded 90° in a direction opposite to the bracket 74d. Further, a plate 74f for preventing the swing of the bags 1 extends downwardly from the gripping portion 74e.

A buffer material 79 is fixed on the gripping portion 74e of the rotary gripper 74 and can grip an edge portion of the bag 1 between the same and the gripping portion 73d of the stationary gripper 73. A plate spring 80 is disposed so that its opposite ends may be fixed to the bracket 73c of the stationary gripper 73 and the bracket 74d of the rotary gripper 74 respectively, and it urges the arm 74c of the rotary gripper 74 about the shaft portion 74a in a counterclockwise direction in FIG. 7. A bush plate 81 is secured to the carrier 51 with the interposition of a partition panel 82 in order to slidably support the shafts 62, 62a (FIGS. 5 and 6). In addition, the above-mentioned carrier 51, shafts 62, 62a, slider-A 67 and slider-B 70 may be made of carbon fiber reinforced plastics.

Each bag 1 transferred from the preliminary opening device 103 is gripped between the grippers 71 and 71a in the following manner. In the first place, the arm 74c of the rotary gripper 74 is pushed up in a direction of an arrow Z in FIG. 7 by a push-up rod, a cam or the like which is not shown, thereby causing the rotary gripper 74 to clockwise rotate against the plate spring 80. After the bag has been fed to between the stationary gripper 73 and the rotary gripper 74, the latter is counterclockwise rotated in order to grip the bag 1 between these grippers. The guide rails 66, 66a are each folded in its edge portion having a predetermined width toward the side of the carrier 51. Therefore, when the carrier 51 has been forwarded to the bag opening and shaping device 106, the rollers 65, 65a are guided by the guide rails 66, 66a to move as much as a predetermined distance toward each other, i.e. toward the carrier 51. As a result, the shafts 62, 62a move likewise and the space between the grippers 71a, 71 is made narrow, thereby causing the bag 1 to open.

The distance between the guide rails 66 and 66a is extended at the position of the sealing device 110, so that the space between the grippers 71a and 71 is also extended and the opening of the bag 1 is consequetly closed. When the carrier 51 has reached a postion above the conveyor 115, the rotary gripper 74 is clockwise rotated again to remove the bag product 1a.

As mentioned above, the carrier 51 can be slidably moved in upward and downward directions by means of the column-like lugs 57 fixed to the chain conveyors 104. Therefore, since the lifting members 109, 114 can move the carrier 51 up and down, it is not necessary to lift and lower the heavy filling device 108 and sealing device 110 any more.

Further, the distance between the grippers 71a and 71 can be varied by the movement of the shafts 62 and 62a. Accordingly, when the bags 1 each having a different size are used, the apparatus can be applied to such bags only by varying the space between the guide rails 66, 66a.

Furthermore, moving members such as the above-mentioned carrier body 51, shafts 62, 62a, sliders 67, 70 and the like may be made of carbon fiber reinforced plastics instead of a matal such as stainless steel. As a result, these members can be reduced in their weight to one-half or less and still can maintain a predetermined strength. Moreover, because of the reduction in the weight, a capacity of driving sources such as the motor and the like can also be lowered.

Next, reference to the bag opening and shaping device will be made.

Each bag 1 transferred from the preliminary opening device 103 to the grippers 71, 71a must be expanded to an enough degree prior to the filling of a material. Moreover, it must be confirmed whether or not the bag 1 is surely gripped by the grippers 71, 71a. If the bag 1 is not sufficiently expanded, an amount of the filling material will be small or the material will spill from the bag 1. Further, if the bag 1 is not surely grippted, it will fall in transit or its sealing will be impossible. For these reasons, it is required to dispose the bag opening and shaping device.

In FIG. 12, an embodiment of this bag opening and shaping device 106 is exhibited.

A nozzle 85 which will be airtightly thrust into the bag 1 is formed into a shape similar to that of an opening of the bag 1 in its sectional view. In the nozzle 85, there are provided a high-pressure compressed air passage 86 and a low-pressure air passage 87. An air pipe 88 is connected to an upper end of the high-pressure compressed air passage 86 and extends to a compressed air source which is not shown. Through this air pipe 88, air having a pressure of 1 to 2.5 kg/cm$^2$ is fed to the nozzle 85. Further, at the lower end 85a of the high-pressure compressed air passage 86, its inner diameter is contracted. An air tube 90 is connected to the above-mentioned low-pressure air passage 87 and extends to a pressure detecting switch 94. This pressure detecting switch 94 serves to detect a pressure of low-pressure air (generally 0.005 to 0.05 kg/cm$^2$) fed through the low-pressure air passage 87 and send an output signal to an electrical control circuit 83. A cover cylinder 89 is integrally fixed to a supporting plate 99 which is secured, by means of a bolt 98, to a duct 97 fitted to the body frame, and the above-mentioned air pipe 88 and the air tube 90 extend through this cover cylinder 89. Reference numeral 96 is a compression spring which is interposed between the supporting plate 99 and a collar 92 fixed to the air pipe 88 and which always presses the air pipe 88, i.e. the nozzle 85 in a downward direction. Numeral 84 is a guide pin which projects from a collar 93 integrally fixed to an upper end of the air pipe 88 and which is inserted into an orifice 91 formed in the supporting plate 99. Therefore, the nozzle 85 can be moved up and down by the guidance of this guide pin 84.

According to the bag opening and shaping device 106, the bags 1 are sufficiently expanded and the bags 1 having defective openings are detected. That is to say, the nozzle 85 supported by the duct 97 which has been lowered by a suitable means not shown is thrust into the opening of each bag 1 to seal it. High-pressure compressed air is then fed to the bag 1 through the air pipe 88 connected to an air compression source not shown and the high-pressure compressed air passage 86 in order to sufficiently expand the bag 1. At this time, a pressure in the bag 1 is led to the pressure detecting switch 94 through the low-pressure air passage 87 formed in the nozzle 85 and the air tube 90. When an internal pressure not lower than a certain set and predetermined pressure is detected by the pressure detecting switch 94, the pressure detecting switch 94 will send a signal of "the opening being normal" to the electrical control circuit 83. To the contrary, when a detected pressure is lower than the predetermined level, i.e. when the bag 1 is obliquely sited and a space is thus present between the nozzle 85 and the opening of the bag 1, the pressure detecting switch 94 will send an output signal of "the opening being abnormal" to the electrical control circuit 83.

When receiving the signal of "the opening being abnormal", the electrical control circuit 83 of the bag opening and shaping device 106 activates the defective bag eliminating device 107, whereby the bag 1 is disengaged from the grippers 71, 71a and is then eliminated out.

Next, reference to the filling device will be made.

It is disadvantageous to discharge a material through the filling device, when the grippers 71, 71a gripping no bag 1 (this fact is detected by the bag presence detecting device 105) arrive at the position where the filling device lies, or when the grippers 71, 71a between which the bag 1 has already been eliminated by the defective bag eliminating device 107 arrive at the position where the filling device is arranged. In other words, the carrier 51 is provided with plural pairs of grippers 71, 71a as described above and a certain pair of them has no bag 1 sometimes, therefore it is unnecessary to feed the material to the space between the grippers having no bag, but it is necessary to feed it to between the grippers normally having the bag 1 therebetween.

In the following, an embodiment of this filling device will be decribed in reference to FIGS. 13 to 15.

A link mechanism 21 is connected and interlocked to a suitable driving source not shown, for example, a driving source for the chain conveyor 104. Metering cylinders 22 are provided as many as the number of the carrying lines for the bags 1 which are carried by the chain conveyor 104, and pistons 23 are reciprocated by the link mechamisme 21. In a three-way valve 24, one 24A of the respective orifices is connected to the metering cylinder 22. Reference numeral 25 is a storage tank for storing the filling material therein, and this storage tank is connected, at its discharge lower end, to another orifice 24C in the three-way valve 24. A feeding pipe 27 is connected, at its one end portion 27A, to the remaining one orifice 24B in the three-way valve 24. A return pipe 30 is connected, at its one end portion 30A, to the storage tank 26 and is connected, at another end portion 30B thereof, to the feeding pipe 27.

Numeral 29 is a filling nozzle which comprises two poppet valves 29A, 29B, a coupling rod 29C for coupling them and lugs 29D, 29E with which the poppet valves 29A, 29B contact respectively, and this constitution means that the filling nozzle 29 mechanically has a valve for opening and closing the end portion of the feeding pipe 27 and a valve for the return pipe 30 simultaneously. Further, numeral 28 is a fluid pressure actuator for reciprocating the coupling rod 29C.

Filling the bags 1 with the material is carried out by quantitatively metering the material which is stored in the storage tank and by feeding it through the feeding pipe 27 in accordance with the following procedure: As shown in FIG. 13, a rotary valve 24D is rotated by driving the link mechanism 21 to a position where the storage tank 25 is connected to the metering cylinder 22. Afterward, the piston 23 is pulled toward the right in the drawing in order to suck the metered material into the metering cylinder 22. At this time, the filling nozzle 29 functions so as to shut the end portion of the feeding pipe 27. That is to say, the poppet valves 29A, 29B are lifted by means of the fluid pressure actuator 28, whereby the poppet valve 29A is brought into contact with the lug 29E.

Subsequently, as shown in FIG. 14, the rotary valve 24D is rotated so as to reach a position where the feeding pipe 27 is connected to the meterming cylinder 22, and the piston 23 is then caused to move toward the left in the drawing in order to squeeze out the material from the metering cylinder 22 in an arrow direction in the drawing. At this time, the poppets 29A, 29B are pushed down by the fluid pressure actuator 28 as shown in the drawing in order to bring the poppet valve 29B into contact with the lug 29D. Therefore, the end portion of the feeding pipe 27 is opened and, to the contrary, the connection between the return pipe 30 and the discharge feeding pipe 27 is cut off, whereby the bag 1 is filled with the material.

If the bag 1 is not gripped by the grippers 71, 71a and any bag 1 is not present at the end of the feeding pipe 27, the output from the bag presence detecting device 105 and the electrical control circuit 83 will permit the fluid pressure actuator 28 to be controlled, whereby the end portion of the feeding pipe 27 is kept closed as shown in FIG. 15. In this case, the material discharged from the metering cylinder 22 is returned to the storage tank 25 through the feeding pipe 27, the filling nozzle 29 and the return pipe 30. As be definite from the foregoing, it depends on the fluid pressure actuator 28 whether or not the material is fed through the feeding pipe 27, therefore the operation of stopping the link mechanism 21 is not necessary any more. In consequence, even in the case that the bags 1 are carried along a plurality of the carrying lines, the link mechanism 21 can always be kept moving, and the constitution of the apparatus can be extremely simplified.

Figure 23:
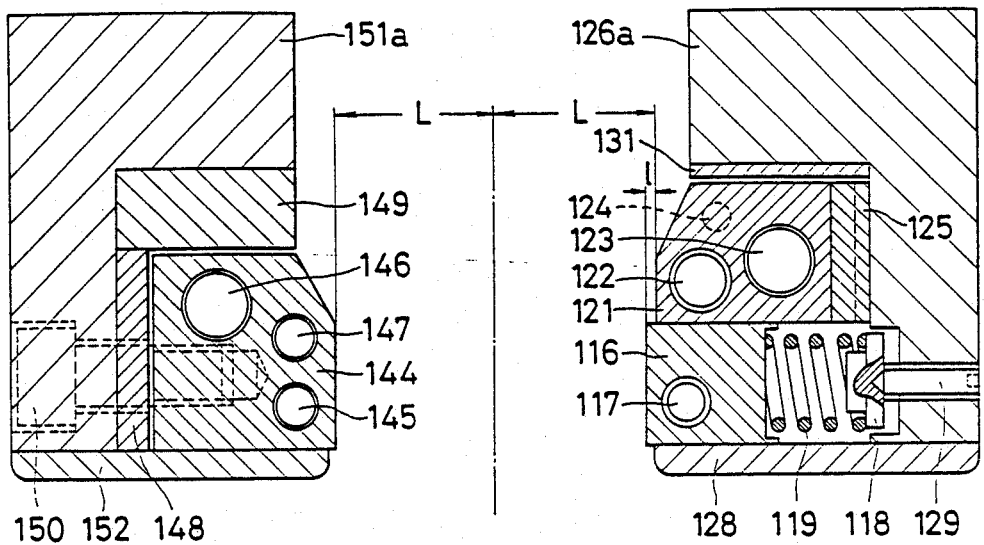
FIG. 23 is a sectional view taken along a line XXIII—XXIII in FIG. 19.
Figure 24:
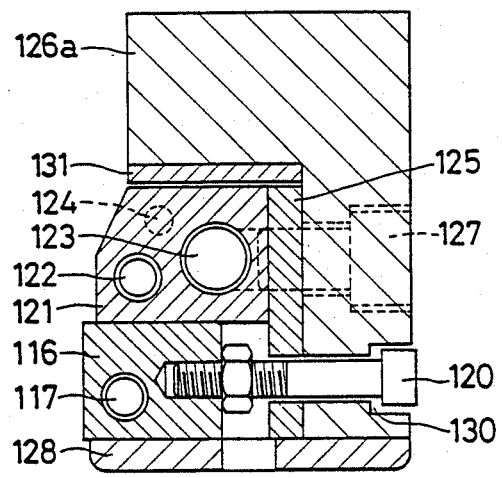
FIG. 24 is a sectional view taken along a line XXIV—XXIV in FIG. 19.

Next, the sealing device 110 will be described in detail in accordance with an embodiment illustrated in FIGS. 16 to 29. In FIGS. 23 and 24, a heat pipe 117 is buried in a movable seal bar 116 and a compression spring 119 is interposed between the seal bar 116 and a spring cradle 118. Further, a bolt 120 is screwed in the seal bar 116. In a stationary heat bar 121, there are buried a heat pipe 122, a cartridge heater 123 and a thermocouple 124, and the stationary heat bar 121 is secured to a seal bar support 126a via a thermal insulating material 125 by means of a bolt 127. The insulating material 125 has the same lateral length as the seal bar support 126a and includes cutouts which allow the compression spring 119 and the bolts 120, 127 to loosely pass therethrough.

Numerals 126a to 126c are seal bar supports each of which has a plate 128 secured at its lower end portion by a bolt or the like not shown, and between the plate 128 and the stationary heat bar 121, the movable seal bar 116 is slidably interposed. Moreover, a bolt 129 for supporting the spring cradle 118 is screwed in the seal bar support 126a, and a stepped orifice 130 is formed in the seal bar support 126a so as to allow a stem portion and a head portion of the bolt 120 to loosely pass therethrough. A thermal insulating material 131 is fixed to the seal bar support 126a, confronting the stationary heat bar 121, by a bolt not shown. Holders 132 are secured to the opposite upper end portions of the seal bar support 126a by welding or the like, and on each of these holders, a cam follower 133 is pivotally mounted (FIG. 19).

Figure 17:
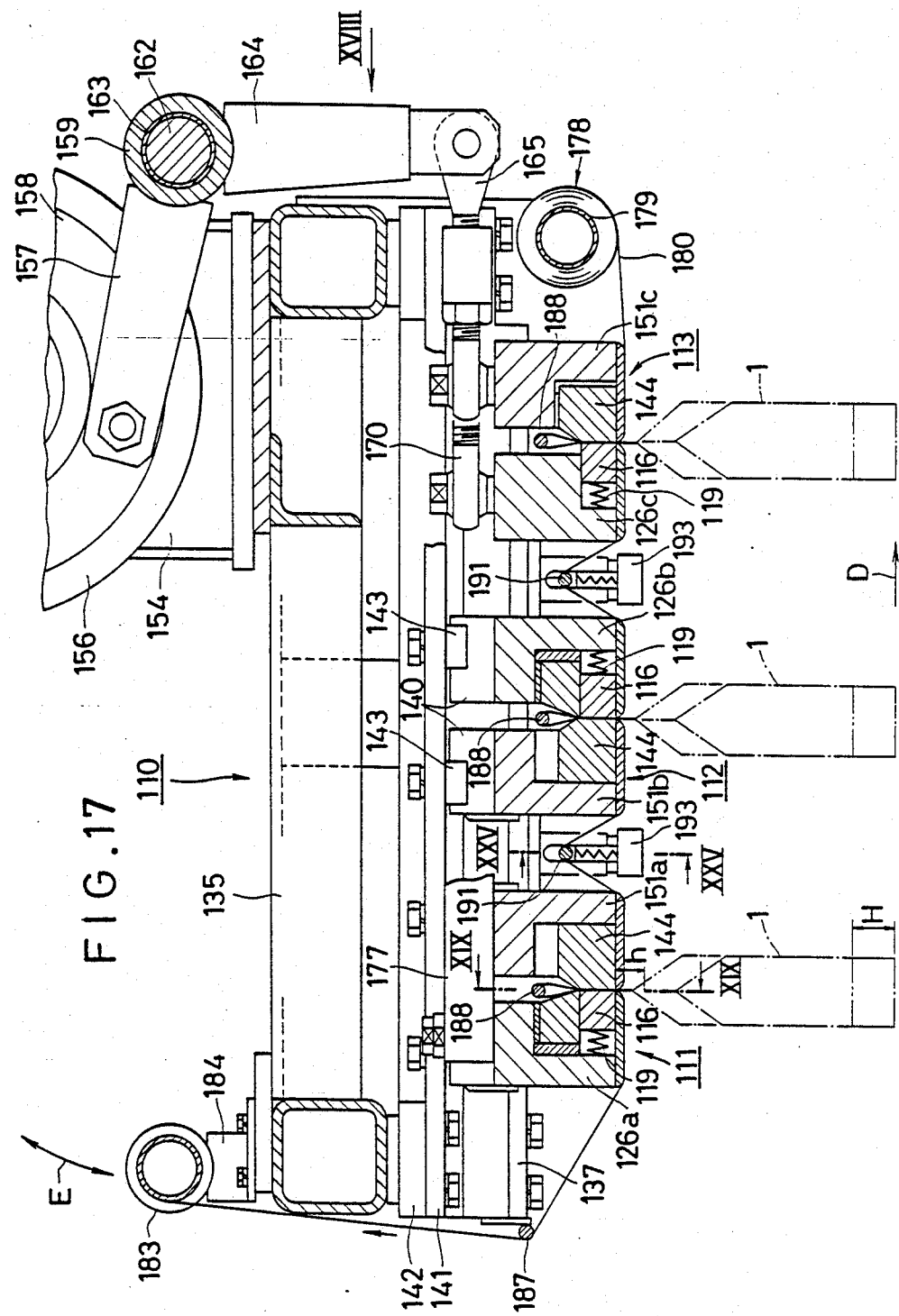
FIG. 17 is a sectional view taken along a line XVII—XVII in FIG. 16.

A rail 134 is supported on a main frame 135 via a block 136, and the cam followers 133 are in a slidable state. A double side rail 137 is disposed at the intermediate position 138 of the apparatus body (in this embodiment, the intermediate position means a center of six carrying lines for the bags 1 and divides these carrying lines into two parts each including the three carrying lines) and is supported on the main frame 135 via a block 139, and the cam follower 133 is in a movable state. Reference numeral 140 is a guide block which is fixed to the seal bar support 126a (FIGS. 17 and 19). A support plate 141 is supported on the main frame 135 with the interposition of a block 142 and has a cam follower 143 for guiding the guide block 140.

Numeral 144 is a stationary heat and seal bar in which a heat pipe 145, a cartridge heater 146 and a thermocouple 147 are buried, as shown in FIG. 23. Further, the stationary heat and seal bar 144 is secured to a seal bar support 151a via thermal insulating materials 148 and 149 by means of a bolt 150, and has the same lateral length as the above-mentioned heat bar 121 and seal bar support 126. Numerals 151a to 151c are seal bar supports each of which has a plate 152 secured thereto at its lower end portion. Further, as in the aforementioned seal bar support 126, each of the seal bar supports 151a to 151c is provided with the holder 132, the cam follower 133 and the guide block 140, is guided by the rail 134, the double side rail 137 and the cam follower 143, and is adapted to move in a direction opposite to the above-mentioned seal bar support 126.

Figure 16:
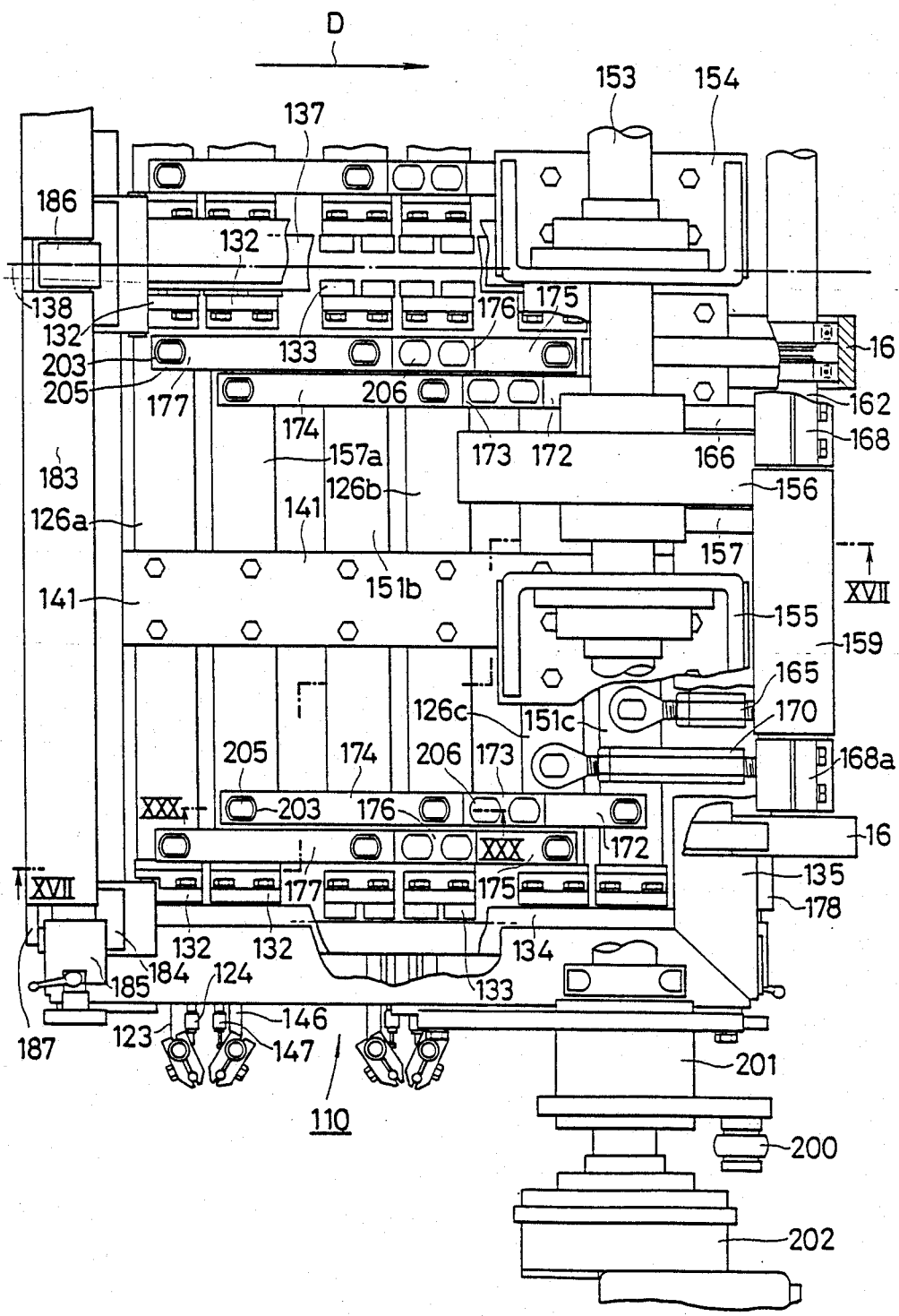
FIG. 16 is a plan of a sealing device.
Figure 18:
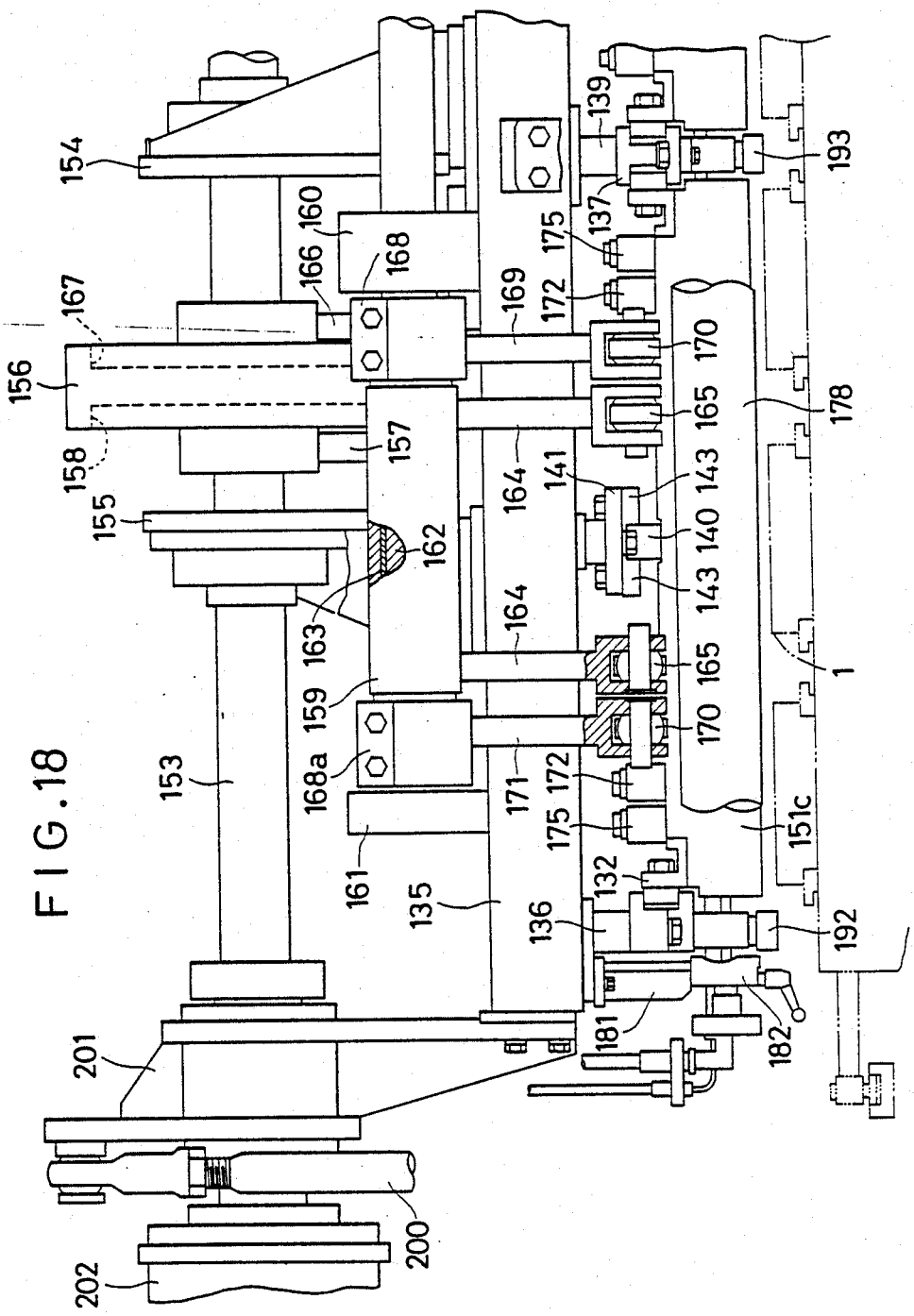
FIG. 18 is a view which is seen from the direction of the arrow XVIII in FIG. 17.

Next, a driving relation between the seal bar supports 126 and 151 will be described in reference to FIGS. 16 and 18. Numeral 153 is a driving shaft which is pivotally supported by stands 154, 155 and the like, with a rotational frequency of the driving shaft set to a predetermined level by an electric motor and a reduction gear which are not shown. Numeral 156 is a double side grooved cam which is integrally joined to the driving shaft 153 by a key or the like. Numeral 157 is an upper lever, an upside end portion of which functions to cause the a cam follower not shown to engage with a groove 158 of the double side grooved cam 156 and a downside end portion of which is integrally joined to a sleeve 159 by welding or the like. The sleeve 159 is axially supported via a bush 163 by a shaft 162 which is rotatably and axially held at the opposite ends thereof by brackets 160, 161 fixed on the main frame 135.

With regard to lower levers 164, its upside end portions are integrally secured to opposite end portions of the sleeve 159 by welding or the like and its downside end portions are coupled to coupling elements 165, which are fixed on the seal bar support 151c. With regard to the above-mentioned upper lever 166, its upside end portion functions to cause a cam follower not shown to engage with a groove 167 which is opposite to the aforesaid groove 158 in phase, and its downside end portion is secured to a boss 168 which is integrally mounted on the shaft 162 by means of a key or the like. Numeral 169 is a lower lever, an upside end portion of which is fixed to a boss 168 and a downside end portion of which is coupled to a coupling member 170, which is fixed to the seal bar support 126c.

Figure 30:
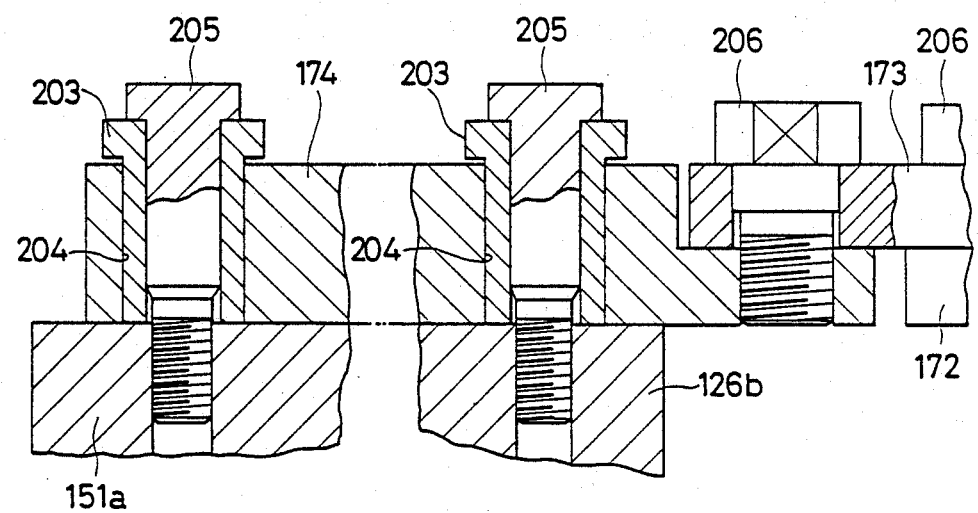
FIG. 30 is a sectional view taken along a line XXX—XXX in FIG. 16.

Numeral 171 is a lever, an upside end portion of which is secured to a boss 168a integral with the shaft 162 and a downside end portion of which is coupled to the coupling element 170. A coupling block 172 is coupled to the seal bar support 151c by a bush 203 and a bolt 205 which will be described hereinafter, and is coupled to an intermediate member 173 by a bolt 206. A coupling block 174 is coupled to the coupling block 172 via the intermediate member 173 by the bolt 206 and serves to accomplish the coupling of the seal bar supports 126b and 151a to each other via the bush 203 and the bolt 205. The bushes 203 are inserted into orifices 204 in the coupling blocks 172 and 174 and are fixed to the seal bar supports 151c, 126c and 151a, with the bolts 205 inserted into the orifices 204 (FIG. 30). The coupling blocks 172, 174 are in a fitting relation rotatable about the bushes 203. The bolts 206 serve to fix the coupling blocks 172, 174 and the intermediate member 173. A coupling block 175 is coupled to the seal bar support 126c by the bush 203 and the bolt 205 and is coupled to the intermediate member 176 by the bolt 206. A coupling block 177 is coupled to the coupling block 175 via the intermediate 176 by the bolt 206 and serves to accomplish the coupling of the seal bar supports 151b and 126a to each other by the bush 203 and the bolt 205. As a result, the rotation of the coupling blocks about the bushes 203 permits compensating a gap between a thermal expansion of the heated seal bar supports 126a, 126b, 151a, 151b and a contraction of the cooled seal bar supports 126c, 151c.

Next, reference will be made to a winding operation of a heat-resistant cloth, i.e. a Teflon sheet. Numeral 178 is a delivery roll where a predetermined amount of the Teflon sheet 180 is wound about a commercially available paper tube 179 (the sheet used in this embodiment has a width corresponding to the three bags 1). Further, the delivery roll 178 is supported at the opposite ends thereof by holders 182 which are fixed to the main frame 135 via brackets 181 and is adapted to deliver a predetermined length of the sheet at the time of the renewal of sealing surfaces (FIGS. 17 and 18). A Winding roll 183 is held by holders 185, 186 which are fixed to the main frame 135 via brackets 184 and is adapted to wind up a predetermined length of the sheet at the time of the renewal of the sealing surfaces. Guide bars 187 are fixed to the rail 134, the double side rail 137 and the like and serve to guide the Teflon sheet 180.

As shown in FIG. 19, stationary guide bars 188 are disposed between the seal bar supports 126 and 151 and are supported by a holder 189 secured to the rail 134 and another holder 190 secured to the double side rail 137 on the lower surface thereof. Further, on these stationary guide bars, the Teflon sheet 180 is windingly supported.

Figure 25:
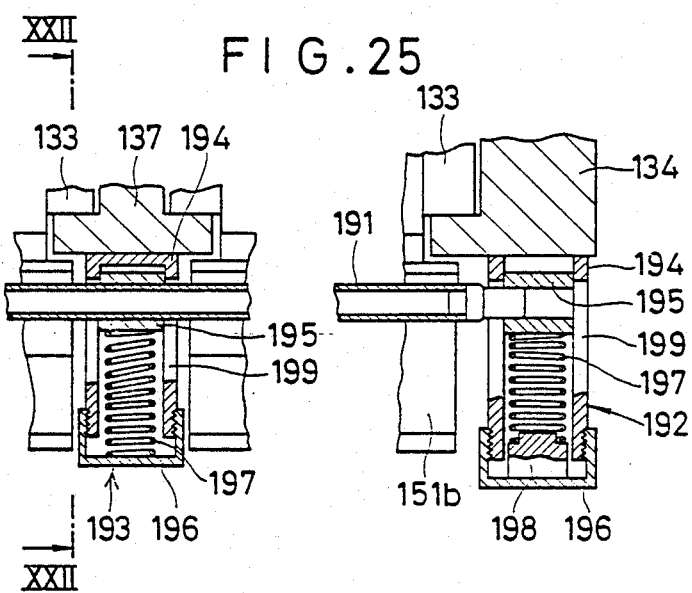
FIG. 25 is a sectional view taken along a line XXV—XXV in FIG. 17.

Movable guide bars 191 are disposed between the seal bar supports 151a and 151b and between the seal bar supports 126b and 126c respectively, as shown in FIG. 17. Further, as seen in FIGS. 22 and 25, each movable guide bar 191 is supported by a holder 192 fixed to the rail 134 and another holder 193 fixed to the double side rail 137 and is adapted to windingly support the Teflon sheet 180. The holder 192 comprises a hollow cylinder member 194, a slider 195 inserted into the cylinder member 194 slidably in upward and downward directions, a cap nut 196 screwed in the lower end portion of the cylinder member 194, and a compression spring 197 disposed between the slider 195 and a spring seat 198, an end portion of the movable guide bar 191 being inserted into the slider 195, whereby the above-mentioned movable guide bar 191 can move upward and downward within a vertically extending cutout 199.

A structure of the holder 193 is the same as that of the holder 192 just described with the exception that the spring seat 198 is deleted therefrom. Incidentally, a required passing sheet length of the Teflon sheet 180 between the delivery roll 178 and the winding roll 183 varies at the times of a heat sealing (FIG. 17) and a bag opening (FIG. 20), but its varied length can be absorbed by the upward and downward movements of the movable guide bar 191, with the result that the Teflon sheet 180 can always maintain a stretching state. Furthermore, a size relation of the stationary guide bar 188, the seal bar support 126 or 151 and the movable guide bar 191 is determined so that each passing length of the sheet 180 may be equal as shown by an alphabet x in FIG. 26.

Reference numeral 200 is a lifting lever the upper end of which is coupled to a bracket 201 fixed to the main frame 135 and the lower end of which is connected to a driving source not shown, whereby the whole sealing device 110 can be rotated 90° about the driving shaft 153 in a direction of an arrow E in FIG. 17. The driving shaft 153 is axially supported at the opposite ends thereof by bearings 202 fixed to stands which are not shown. Moreover, the movable seal bar 116, the stationary heat bar 121 and the stationary heat and seal bar 144 which constitute the cooling device 113 are provided with cooling members instead of the heater 123 and the like.

Reference to the behavior of the sealing device 110 will be described. In each of the first and second heat sealing devices 111, 112, as shown in FIG. 23, a surface pressure on the movable seal bar 116 is previously set by adjusting the bolt 129, a temperature of the stationary heat bar 121 is set to a predetermined level by the use of the cartridge heater 123, the heat pipe 122 and the thermocouple 124, and a temperature of the movable seal bar 116 is set to a predetermined level by the transmission of heat from the stationary heat bar 121. In this case, the temperature of the movable seal bar 116 can be uniformly distributed by the heat pipe 117. On the other hand, the stationary heat and the seal bar 144 are also set to a predetermined temperature by the cartridge heater 146, the heat pipe 145 and the thermocouple 147.

Next, the driving shaft 153 is rotated, and the resulting rotary motion is then converted into a linear motion of the coupling member 170, whereby the seal bar supports 126c, 151b and 126a are moved as much as a distance L toward the carrying direction D of the bags 1 with the aid of the coupling block 175, the intermediate member 176 and the coupling block 177 in order to accomplish the heat sealing of the bags 1, as shown in FIG. 23. On the other hand, the seal bar supports 151c, 126c and 151a are also moved as much as the lengh L away from the carrying direction D of the bags 1 by converting the rotary motion of the driving shaft 153 into a linear motion in order to carry out the cooling and thus the hardening of the heat sealed upper opening portions of the bags 1, as shown in FIG. 17 (at this time, the movable seal bar 116 contracts the compression spring 119 as much as a length l).

Before a group of the seal bar supports 126c, 151b, 126a and aother group of the seal bar supports 151c, 126b, 151a are advanced toward each other by the distance L, the bags 1 are lifted as much as a distance H while gripped on the carrier 51 (FIG. 17). A value obtained by subtracting a distance h between the upper end of the unlifted bag 1 and the lower end of the seal bar 144 from the above distance H will be a width of the heat sealed portion of the bag 1.

After a predetermined time has lapsed, the group of the seal bar supports 126c, 151b, 126a and the other group of the seal bar supports 151c, 126b, 151a are moved away from each other in order to disengage the bags 1. The operation described above is repeated to accomplish the heat sealing, the cooling and the hardenring of the bags 1 in turn.

Next, a procedure of carrying out the renewal of the Teflon sheet 180 will be described in reference to FIGS. 26 to 28.

When the renewal is intended from the state of FIG. 26 to feed new seal surfaces, the winding roll 183 is rotated to wind up as long a sheet portion as 2x of the Teflon sheet 180. The portions represented by cross symbols in FIG. 27 are new seal surfaces. Further, at the time of a next renewal, a length of 2x of the sheet is likewise wound up in order to feed new seal surfaces represented by circular symbols in FIG. 28. At the third renewal, a length of 14x of the sheet is wound up, so that the state of FIG. 26 is now returned. Subsequently, the similar renewal procedure can be repeatedly carried out.

As be definite from the foregoing, according to the apparatus for filling the bags of the present invention, it can be detected whether or not the grippers disposed in the apparatus surely grip the bags. Further, in the case that the plurality of filling devices is connected to the one link mechanism and is driven thereby, the only one filling device can be stopped, when a certain bag on this filling device should not be filled with the material. In consequence, it is possible to provdie the apparatus in which such a function is incorporated and a simplified structure suitable for the transit of the bags along the plural carrying lines is equipped.

What is claimed is:

1. An apparatus for filling bags with a material and for sealing them, characterized by comprising:
    a pair of chain conveyors disposed in parallel vertical planes;
    a plurality of carriers held between said chain conveyors;
    a plurality of grippers for the bags disposed on each of said carriers;
    a plurality of filling nozzles, having valves, for feeding the material to said bags gripped by said grippers;
    a storage tank for storing the material;
    a plurality of feeding pipes and return pipes for connecting said filling nozzles to said storage tank;
    metering cylinders equipped with reciprocating pistons;
    three-way valves each disposed in a respective said storage tank, said metering cylinder and said feeding pipe;
    a link mechanism for actuating said three-way valves and said pistons in said metering cylinders; and
    actuating devices for the valves of said filling nozzles.

2. In a bag-filling apparatus having a pair of chain conveyors capable of transporting bags in the direction of their thickness, gripper means supported in such a manner as can be moved at an angle to the direction of running of said chain conveyors and adapted to grip both end edges of the bag, and guide rails adapted to control the movement of said gripper means, the improvement comprising a plurality of carriers supported between said chain conveyors, each of said carriers being provided with a pair of rods so supported as to slide at right angles to the direction of transportation of the bags and said gripper means being attached to each of said rods so as to move said rods in the axial direction by means of said guide rails;
    a plurality of filling nozzles, having valves, for feeding the material to said bags gripped by said grippers;
    a storage tank for storing the material;
    a plurality of feeding pipes and return pipes for connecting said filling nozzles to said storage tank;
    metering cylinders equipped with reciprocating pistons;
    a three-way valve on each of said storage tank, said metering cylinder and said feeding pipe;
    a link mechanism for actuating said three-way valves and said piston in said metering cylinders; and
    actuating devices for the valves of said filling nozzles.

* * * * *